United States Patent [19]

Chu et al.

[11] Patent Number: 4,780,435
[45] Date of Patent: Oct. 25, 1988

[54] DIELECTRIC CERAMIC COMPOSITIONS WITH LINEAR TEMPERATURE COEFFICIENT CHARACTERISTICS AND LOW DISSIPATION FACTORS

[75] Inventors: Michael S. H. Chu; Julie E. Carminati, both of Lewiston, N.Y.

[73] Assignee: TAM, Ceramics, Inc., Niagara Falls, N.Y.

[21] Appl. No.: 38,865

[22] Filed: Apr. 15, 1987

[51] Int. Cl.$^4$ .............................................. C04B 35/46
[52] U.S. Cl. .................................................. 501/136
[58] Field of Search ............... 501/136, 137, 138, 139; 361/321

[56] References Cited

U.S. PATENT DOCUMENTS

| | | |
|---|---|---|
| 4,338,403 | 7/1982 | Kawashima et al. ........... 501/139 X |
| 4,468,472 | 8/1984 | Kashima .............................. 501/137 |
| 4,500,942 | 2/1985 | Wilson .............................. 501/139 X |
| 4,506,026 | 3/1985 | Hodgkins ............................ 501/135 |

FOREIGN PATENT DOCUMENTS 0068899 6/1978 Japan .................................. 501/136
0114812 10/1978 Japan .................................. 501/136

Primary Examiner—William R. Dixon, Jr.
Assistant Examiner—James M. Hunter, Jr.
Attorney, Agent, or Firm—Kenyon & Kenyon

[57] ABSTRACT

Ceramic dielectric compositions which have dielectric constants (K) of 60–140, dissipation factors (DF) of less than 0.1 percent, and temperature coefficient characteristics (TCC) of −20 ppm to −1000 ppm/°C.

11 Claims, 2 Drawing Sheets

DIELECTRIC CERAMIC COMPOSITIONS WITH LINEAR TEMPERATURE COEFFICIENT CHARACTERISTICS AND LOW DISSIPATION FACTORS

BACKGROUND OF THE INVENTION

1. Field of the Invention

This invention relates generally to ceramic dielectric compositions which have dielectric constants (K) of 60 to about 140, dissipation factors (DF) less than 0.1 percent, and temperature coefficient characteristics (TCC) from about −20 ppm to about −1000 ppm/°C. The TCC characteristics meet different designations as described in EIA RS198C specification.

2. The Prior Art

Multilayer ceramic capacitors are commonly made by casting or otherwise forming insulating layers of dielectric ceramic powder; placing thereupon conducting metal electrode layers, usually a palladium/silver alloy in the form of metallic paste; stacking the resulting elements to form the multilayer capacitor; and firing to densify the material thus forming a multilayer ceramic capacitor. Prior art multilayer ceramic capacitors suffer from the disadvantage that they do not exhibit low dissipation factors and predictable capacitance change per degree C. temperature change (TCC) characteristics with respect to their room temperature values. Such characteristics are required in electronic circuit applications such as timing circuits, resonator circuits, or TV tuner circuits.

It would be desirable for dielectric ceramic compositions used in multilayer capacitors for the aforementioned applications to have a stable dielectric constant over a wide temperature range. For example, the dielectric constant should change from its base value at 25° C. (room temperature) per degree C. temperature change (TCC) by not more than −1000 ppm/°C. This change also should be linear and predictable. The insulation resistance times capacitance product of such compositions should be more than 1000 ohm-farads at 25° C. and more than 100 ohm-farads at maximum working temperatures, 125° C. in most cases. Also the dielectric constants (K) should be as high as possible and the dissipation factors (DF) should be as low as possible.

SUMMARY AND OBJECTS OF THE INVENTION

It is therefore an object of the present invention to provide ceramic compositions suitable for manufacturing disc ceramic capacitors and/or multilayer ceramic capacitors using precious metal internal electrodes.

It is a further object of the present invention to provide such ceramic compositions which have dielectric constants from about 60 to about 140, dissipation factors of less than about 0.1 percent, insulation resistance time capacitance products of more than about 1000 ohm-farads at 25° C.

It is a still further object of the present invention to provide such ceramic compositions which have stable temperature characteristics (TC) in which the dielectric constants or capacitance variation with temperature per °C. with reference values at 25° C. do not exceed about negative 1000 parts per million.

It is a still further object of the present invention to provide such ceramic compositions in which the dielectric constant or capacitance variation with temperatures per °C. with reference values at 25° C. are linear and predictable. Other objects will be in part obvious and in part hereinafter pointed out.

In accordance with the above-stated objects a dielectric composition is provided comprising a precursor material consisting essentially of neodymium oxide, titanium oxide, barium carbonate, zirconium oxide, silicon dioxide and calcium titanate, strontium titanate, niobium pentoxide, and cobalt oxide.

The present invention provides novel dielectric ceramic compositions having a dielectric constant between about 60 and about 140, with linear TC and TCC characteristics, and with low dissipation factors. Such ceramic compositions can be prepared by firing the component oxides or precursors thereof at a temperature between about 1260° C. to 1340° C. Because of their low dissipation factors, and linear TC behavior, the ceramics of this invention are suitable for applications in electronic devices where ceramic disc or multilayer capacitors with low loss and predictable variation of capacitance with temperature are required such as in a TV tuner.

DETAILED DESCRIPTION OF A PREFERRED EMBODIMENT

Figure 1:
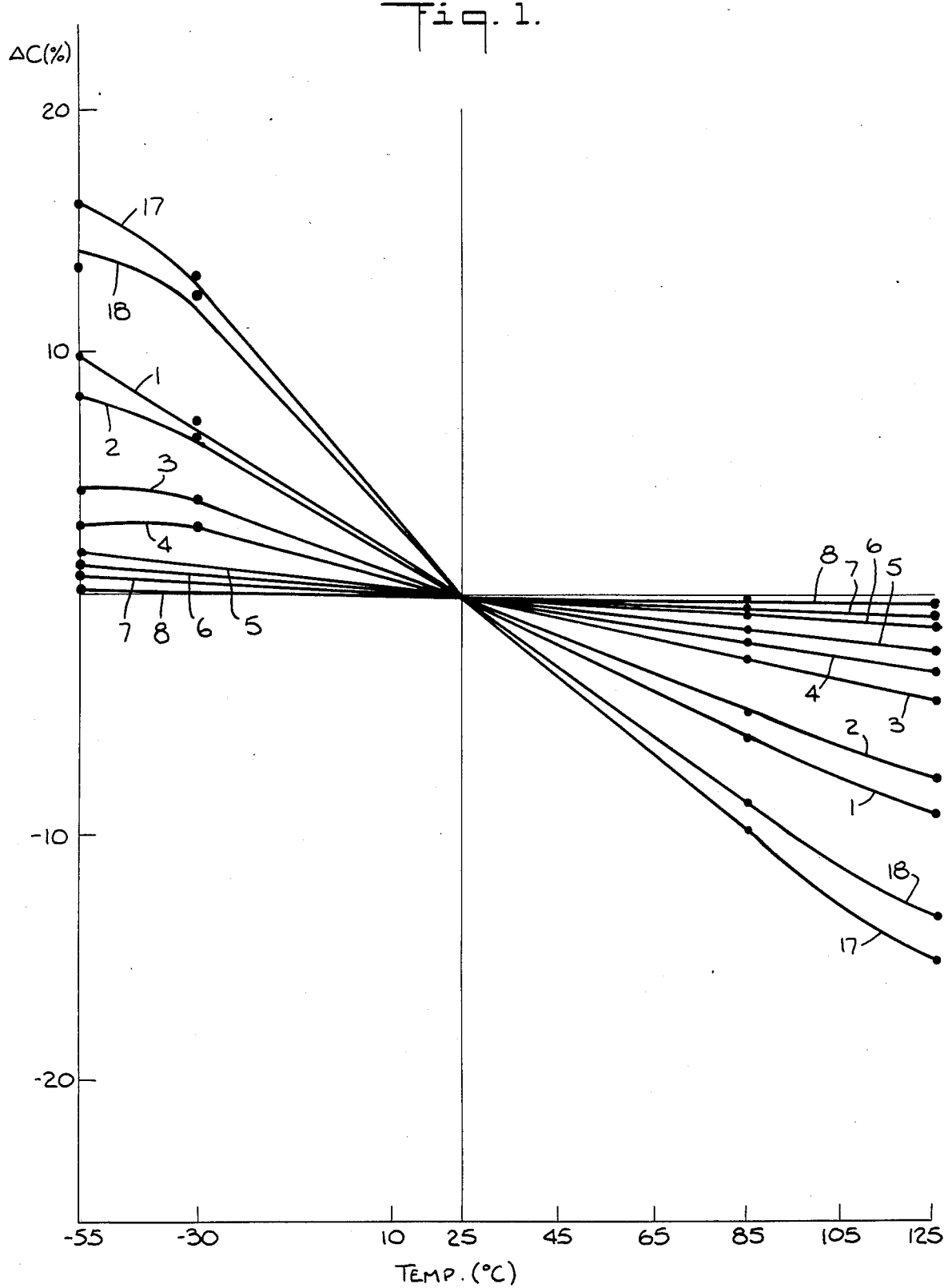
FIG. 1 illustrates the change in capacitance for a given change in temperature for the compositions of this invention.

In a preferred embodiment of the present invention a dielectric composition is provided which comprises about 40.2–98.34 weight percent of a precursor material consisting essentially of about 48.49 weight % $Nd_2O_3$, about 33.71 weight % $TiO_2$, about 14.39 weight % $BaCO_3$, about 1.42 weight % $ZrO_2$, about 1.48 weight % $SiO_2$, about 0.51 weight percent $CaTiO_3$; and about 0.0–57.51 weight % $SrTiO_3$, about 1.27–3.14 weight % $Nb_2O_5$, and about 0.23–0.43 weight % CoO.

In another embodiment, the ceramic dielectric compositions are formed from a mixture of about 40.20 weight percent of a ceramic precursor material which comprises about 48.49 weight % $Nd_2O_3$, about 33.71 weight % $TiO_2$, about 14.39 weight % $BaCO_3$, about 1.42 weight % $ZrO_2$, about 1.48 weight % $SiO_2$, and about 0.51 weight % $CaTiO_3$ with the balance of the dielectric composition material consisting essentially of about 56.40 weight percent of strontium titanate, $SrTiO_3$, about 3.14 weight percent of niobium pentoxide, $Nb_2O_5$ and about 0.26 weight percent of cobalt oxide, CoO.

In this latter embodiment the $SrTiO_3$ to precursor weight ratio is about 1.40 and the ceramic composition has negative 1000 ppm/°C. TC characteristics.

In another embodiment, the dielectric compositions are formed from a mixture of about 43.57 weight percent of a ceramic precursor material comprising about 48.49 weight % $Nd_2O_3$, about 33.71 weight % $TiO_2$, about 14.39 weight % $BaCO_3$, about 1.42 weight % $ZrO_2$, about 1.48 weight % $SiO_2$, and about 0.51 weight % $CaTiO_3$ with the balance of the dielectric composition consisting essentially of about 53.13 weight percent of strontium titanate, $SrTiO_3$, about 3.04 weight percent of niobium pentoxide, $Nb_2O_5$, and about 0.26 weight percent of cobalt oxide, CoO. In this embodiment the $SrTiO_3$ to precursor weight ratio is 1.22 and the ceramic composition has negative 900 ppm/°C. TC characteristics.

In another embodiment, the dielectric compositions are formed from a mixture comprising about 60.49 weight percent of a ceramic precursor material consisting essentially of 48.49 weight % $Nd_2O_3$, about 33.71 weight % $TiO_2$, about 14.39 weight % $BaCO_3$, about 1.42 weight % $ZrO_2$, about 1.48 weight % $SiO_2$, and about 0.51 weight % $CaTiO_3$ with the balance of the dielectric composition consisting essentially of 36.66 weight percent of strontium titanate, $SrTiO_3$, about 2.58 weight percent of niobium pentoxide, $Nb_2O_5$, about 0.27 weight percent of cobalt oxide, CoO. In this embodiment, the $SrTiO_3$ to precursor weight ratio is about 0.61 and the ceramic composition has negative 580 ppm/°C. TCC characteristics.

In another embodiment of the present invention, the dielectric compositions are formed from a mixture comprising about 69.85 weight percent of a ceramic precursor material consisting essentially of about 48.49 weight % $Nd_2O_3$, about 33.71 weight % $TiO_2$, about 14.39 weight % $BaCO_3$, about 1.42 weight % $ZrO_2$, about 1.48 weight % $SiO_2$, and about 0.51 weight $CaTiO_3$ with the balance of the dielectric composition consisting essentially of 27.64 weight % of strontium titanate, $SrTiO_3$, about 2.24 weight % of niobium pentoxide, $Nb_2O_5$, about 0.27 weight % of cobalt oxide, CoO. In this embodiment the $SrTiO_3$ to precursor weight ratio is about 0.40 and the ceramic composition has negative 430 ppm/°C. TCC characteristics.

In another embodiment of the present invention, the dielectric compositions are formed from a mixture comprising about 78.63 weight percent of a ceramic precursor material consisting essentially of 48.49 weight % $Nd_2O_3$, 33.71 weight % $TiO_2$, 14.39 weight % $BaCO_3$, 1.42 weight % $ZrO_2$, 1.48 weight % $SiO_2$, and 0.51 weight % $CaTiO_3$ with the balance of the dielectric composition consisting essentially of 19.11 weight percent of strontium titanate, $SrTiO_3$, 1.98 weight percent of niobium pentoxide, $Nb_2O_5$, and 0.28 weight percent of cobalt oxide, CoO. In this embodiment the $SrTiO_3$ to precursor weight ratio is about 0.24 and the ceramic composition has negative 275 ppm/°C. TCC characteristics.

In another embodiment of the present invention, the dielectric compositions are formed from a mixture consisting essentially of 82.99 weight percent of a ceramic precursor material consisting essentially of about 48.49 weight % $Nd_2O_3$, about 33.71 weight % $TiO_2$, about 14.39 weight % $BaCO_3$, about 1.42 weight % $ZrO_2$, about 1.48 weight % $SiO_2$, and about 0.51 weight % $CaTiO_3$ with the balance of the dielectric composition comprising about 14.89 weight percent of strontium titanate, $SrTiO_3$, about 1.84 weight percent of niobium pentoxide, $Nb_2O_5$, and about 0.28 weight percent of cobalt oxide, CoO. In this embodiment, the $SrTiO_3$ to precursor weight ratio is about 0.18 and the ceramic composition has negative 210 ppm/°C. TCC characteristics.

In another embodiment of the present invention, the dielectric compositions are formed from a mixture comprising about 87.39 weight percent of a ceramic precursor material consisting essentially of 48.49 weight % $Nd_2O_3$, about 33.71 weight % $TiO_2$, about 14.39 weight % $BaCO_3$, about 1.42 weight % $ZrO_2$, about 1.48 weight % $SiO_2$, and about 0.51 weight % $CaTiO_3$ with the balance of the dielectric composition consisting essentially of 10.60 weight percent of strontium titanate, $SrTiO_3$, about 1.73 weight percent of niobium pentoxide, $Nb_2O_5$, and about 0.28 weight percent of cobalt oxide, CoO. In this embodiment the $SrTiO_3$ to precursor weight ratio is about 0.12 and the ceramic composition has negative 110 ppm/°C. TCC characteristics.

In another embodiment of the present invention, the dielectric compositions are formed from a mixture comprising about 98.34 weight percent of a ceramic precursor material consisting essentially of 48.49 weight % $Nd_2O_3$, about 33.71 weight % $TiO_2$, about 14.39 weight % $BaCO_3$, about 1.42 weight % $ZrO_2$, about 1.48 weight % $SiO_2$, and about 0.51 weight % $CaTiO_3$ with the balance of the dielectric composition consisting essentially of about 1.37 weight percent of niobium pentoxide, $Nb_2O_5$, and about 0.29 weight percent of cobalt oxide, CoO. In this embodiment the $SrTiO_3$ to precursor weight ratio is 0 and the ceramic composition has negative 40 ppm/°C. TCC characteristics.

A fired ceramic body of the present invention is produced by reacting the constituent dielectric oxides of the ceramic preparation during the course of firing, including a ceramic precursor consisting essentially of neodymium oxide, titanium oxide, barium carbonate, zirconium oxide, silicon dioxide, calcium titanate, strontium titanate, niobium pentoxide and cobalt oxide.

In preparing the ceramic composition neodymium oxide, titanium oxide, barium carbonate, zirconium oxide, silicon dioxide and calcium titanate may be slurried together in water, or physically blended together, calcined and milled to fine particle size to form a precursor material. The precursor material is further slurried together in water, or physically blended together with strontium titanate, niobium pentoxide and cobalt oxide. The mixture of the ceramic preparation may be cast into a sheet using standard methods and formed into a multilayer capacitor structure with internal electrodes such as 70 weight % palladium/30 weight % silver. The multilayer capacitor structure is then fired at 1260° C. to 1340° C. for about one to two hours. The fired dielectric compositions of this invention have a dielectric constant (K) from about 60 to about 140, dissipation factor (DF) less than about 0.1%, and a linear temperature coefficient characteristics (TCC) from about negative 20 parts per million to about negative 1000 parts per million. The invention will be further illustrated by the following examples.

EXAMPLE I

A ceramic precursor composition in an amount greater than 500 kgs was made by uniformly mixing about 48.49 weight percent high purity neodymium oxide ($Nd_2O_3$), about 33.71 weight percent titanium oxide ($TiO_2$), about 14.39 weight percent barium carbonate ($BaCO_3$), about 1.42 weight percent zirconium oxide ($ZrO_2$), about 1.48 weight percent silicon dioxide ($SiO_2$) and about 0.51 weight percent calcium titanate ($CaTiO_3$). The neodymium oxide employed in this invention had a purity of at least 99.5 weight percent with the balance consisting of other types of rare earth elements such as lanthanum oxide ($La_2O_3$). All the other materials employed had a purity of more than 99.9 weight percent.

After uniformly mixing the above materials, the slurry was dried, pulverized and calcined at a temperature of 1000° C.–1150° C. for about 1 to 4 hours. The calcined ceramic was then milled to fine average particle size from about 0.90 microns to about 1.5 microns.

About 30 grams of a ceramic composition was prepared by adding to the above ceramic precursor material, high purity strontium titanate (SrTiO$_3$), technical grade fine particle size niobium pentoxide (Nb$_2$O$_5$); and technical grade fine particle size cobalt oxide (CoO) according to the amounts listed in Table 1. The preferred amount of strontium titanate was about 99 weight % pure, the preferred niobium pentoxide was also about 99 weight % pure, and the preferred cobalt oxide was about 70–74 weight % pure in terms of metallic cobalt (because commercially available CoO is a mixture of CoO and Co$_2$O$_3$). The ceramic powders were further blended with 15 to 25 cc of distilled water and mixed thoroughly in a high speed Spex model 800-2 paint mixer manufactured by Spec Industries Inc., N.J. for about 10 minutes. The wet slurry was then dried into a cake and ground with mortar and pestle. Approximately 2.4 to 4.0 cc. of a binder solution including 26 weight percent water, 26 weight percent propylene glycol and 48 weight percent corn syrup was mixed into the ceramic powder in a mortar and pestle which was then granulated through a 40 mesh nylon screen. Discs of the resultant mixture having a diameter of 1.27 cm and a thickness of 0.1 to 0.15 cm were pressed at a pressure of about 38,000 lbs. per square inch in a stainless steel die. The discs were placed on a stabilized zirconia setter and fired at temperatures of 1260° C. to 1340° C. for 1 to 4 hours. After cooling, silver electrodes were painted on the discs which were then fired at 815° C. to sinter on the electrodes. The capacitance change with temperature versus capacitance at 25° C. (TC) was then measured with model ES12110A capacitance bridge at 1 KHz measurement frequency, from −55° C. to +125° C. at about 20° C. intervals. The dielectric constant of each sample (K) was then calculated from the fundamental capacitance equation:

$$K = (5.66 \cdot C \cdot T)/(D \cdot D) \quad (1)$$

where
K = dielectric constant of the sample,
T = thickness of the disc in inches,
D = diameter of the disc in inches, and
C = capacitance of the disc in pico farads.

The temperature characteristics (TC) of each sample were calculated according to the following equation:

$$TC = [(C_T - C_{25})/C_{25}] \times 100 \quad (2)$$

where
TC = temperature characteristic in percent,
$C_T$ = capacitance of the sample at temperature T, and
$C_{25}$ = capacitance of the sample at reference temperature (25° C.).

The temperature coefficient characteristics (TCC) of each sample was calculated from the slope of the TC curve according to the following equation:

$$TCC = [(C_T - C_{25})/C_{25}]/(T - 25) \times 10^6 \quad (3)$$

where
TCC = temperature coefficient in ppm/°C.,
$C_T$ = capacitance of the sample at temperature T,
$C_{25}$ = capacitance of the sample at reference temperature (25° C.), and
T = temperature (°C.) at which TCC is measured.

The dielectric properties of the disc samples of compositions 1–8, as summarized in Table 2, demonstrate that ceramic compositions of this invention have very low dissipation factors and linear TCC behavior. These ceramic compositions are suitable for application in electronic devices where disc capacitors with low loss and predictable capacitance variation vs. temperature are required, such as in a TV tuner. Approximately 400 grams of each of the ceramic compositions as described in compositions 1–8 were charged into a ball mill with ½ inch alumina media together with 280 grams of a binder solution made by uniformly mixing and dissolving 186 grams of dioctylphthalate, about 57 grams Nuostab V-1444, (Nuostab V-1444 is an alkali ion free organic solvent dispersing agent available from Nuodex Co. Inc., N.J.), about 460 ml. of ethanol, about 1843 ml. of toluene, and about 315 grams Butvar B-76 vinyl resin (Butvar B-76 is a binder comprising a mixture of polyvinyl butyal, polyvinyl alcohol and polyvinyl acetate available from Monsanto Corporation). It should be noted that any conventional binder composition may be used with this invention which is compatible with the other materials used as the binder simply provides a vehicle for dispersing the ceramic particles and holding them together when the solvent is removed. Suitable binder compositions are described in "Ceramic Processing Before Firing" Chap. 19. G. Y. Onoda, Jr., et al., John Wiley and Sons (1978), the text of which is hereby incorporated by reference. Polyvinyl alcohol in water and polyvinyl butyl in methyl ethyl ketone/alcohol are examples of suitable binder compositions.

This slurry was milled for 16 hours, discharged and filtered through a 44 micron screen. This slurry had a viscosity of about 1,500 to 30,000 centipoise and was de-aired and cast, in accordance with standard techniques, into a tape with a thickness of 1.5 mils. The tape was converted into multilayer ceramic capacitors having 70 percent palladium/30 percent silver via conventional processes well known in the art. The capacitors were preheated to 260° C. for 48 hours, placed on stabilized zirconia setters and sintered at 1260° C. to 1340° C. for 1 to 4 hours. The sintered capacitors had 10 active dielectric layers with dielectric thickness ranging from 0.85 to 1.10 mil. Termination electrodes of DuPont Silver paint No. 4822, which is a mixture of silver and glass frit in a binder, were applied at opposite ends of the multilayer capacitor to connect alternate electrode layers and these capacitors were fired at 815° C. in a tunnel furnace. The capacitance (C), dissipation factor (DF), insulation resistance (R) and capacitance product (RC) at 25° C. and 125° C., capacitance change with temperature (TC) versus capacitance at 25° C. and capacitance change with temperature per degree C. (TCC) versus capacitance at 25° C. were measured using a General Radio 1683 automatic RLC bridge, a Radiometer IM6 megameter and an Electro Scientific Industries Z110A capacitance bridge with a temperature chamber and computer controlled microprocessor. The capacitance and dissipation factor were measured at 1 KHz measurement frequency. The insulation resistance was measured with DC applied voltage and RC products calculated. The DC breakdown voltage was also measured. The dielectric constant of each sample (K) was then calculated from the fundamental capacitance equation:

$$K = (C \cdot T)/(8.854 \times 10^{-14} L \cdot W \cdot N) \quad (4)$$

where
K = dielectric constant of the sample,

T = thickness of each dielectric layer,
C = measured capacitance value in farads,
L = fired electrode length in cm.,
W = fired electrode width in cm., and
N = number of active dielectric layers (10).

The dielectric properties of the multilayer ceramic capacitors of compositions 1-8, as summarized in Table 3, demonstrate that ceramic compositions of this invention have very low dissipation factors and linear TCC behavior. These capacitors are suitable for application in electronic devices where multilayer ceramic capacitors with low loss and predictable capacitance variations vs. temperature are required, such as in TV tuners.

TABLE 1

| Composition | Precursor (wt. %) | SrTiO₃ (wt. %) | Nb₂O₅ (wt. %) | CoO (wt. %) | SrTiO₃ Precursor wt ratio |
|---|---|---|---|---|---|
| 1 | 40.96 | 57.51 | 1.27 | 0.26 | 1.40 |
| 2 | 44.25 | 54.09 | 1.37 | 0.29 | 1.22 |
| 3 | 64.26 | 34.07 | 1.38 | 0.29 | 0.53 |
| 4 | 72.37 | 25.96 | 1.38 | 0.29 | 0.36 |
| 5 | 78.87 | 19.47 | 1.37 | 0.29 | 0.25 |
| 6 | 83.19 | 15.15 | 1.37 | 0.29 | 0.18 |
| 7 | 87.52 | 10.82 | 1.37 | 0.29 | 0.12 |
| 8 | 98.34 | 0 | 1.37 | 0.29 | 0.00 |

Precursor =
Nd₂O₃: 48.49 wt. %
TiO₂: 33.71 wt. %
BaCO₃: 14.39 wt. %
ZrO₂: 1.42
SiO₂: 1.48 wt %
CaTiO₃: 0.51 wt %

TABLE 2

| Composition | 1 KHz, 1 VRMS K | 1 KHz, 1 VRMS DF (%) | TC (%) −55° C. | TC (%) −30° C. | TC (%) 85° C. | TC (%) 125° C. | TCC (ppm/°C.) −55° C. to 25° C. | TCC (ppm/°C.) 25° C. to 125° C. | Linear | EIA Code |
|---|---|---|---|---|---|---|---|---|---|---|
| 1 | 138 | 0.01 | 9.94 | 7.03 | −5.93 | −9.16 | −1000 | −920 | Yes, FIG. 1 | S2L |
| 2 | 126.5 | 0.03 | 8.121 | 6.49 | −4.90 | −257 | −1000 | −760 | Yes, FIG. 1 | U2J |
| 3 | 99 | 0.01 | 4.17 | 4.08 | −2.72 | −4.27 | −520 | −430 | Yes, FIG. 1 | T2H |
| 4 | 89 | 0.003 | 2.79 | 2.75 | −1.97 | −3.08 | −350 | −300 | Yes, FIG. 1 | S2H |
| 5 | 83 | 0.006 | 1.95 | 4.00 | −1.36 | −2.26 | −240 | −226 | Yes, FIG. 1 | R2H |
| 6 | 75 | 0.008 | 1.41 | 3.38 | −1.00 | −1.41 | −175 | −141 | Yes, FIG. 1 | P2G |
| 7 | 70 | 0.001 | 0.921 | 1.87 | −0.66 | −0.91 | −120 | −90.8 | Yes, FIG. 1 | UIG |
| 8 | 58.3 | 0.008 | 0.10 | 0.78 | −0.05 | −0.04 | −12.9 | −3.79 | Yes, FIG. 1 | COG |

TABLE 3

Figure 2:
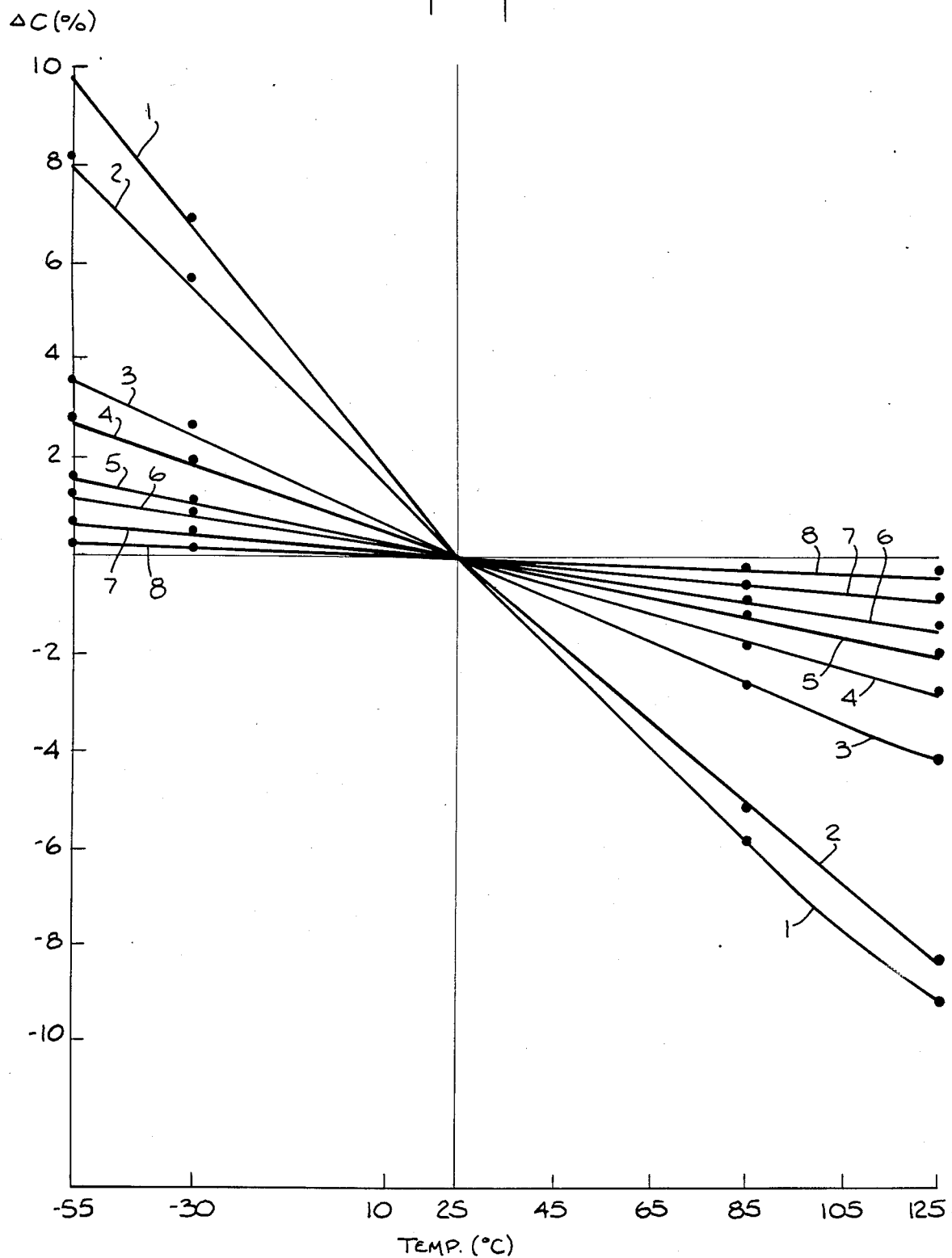
FIG. 2 also illustrates the change in capacitance for a given change in temperature for compositions of this invention.

| Composition | 1 KHz, 1 VRMS K | 1 KHz, 1 VRMS DF (%) | TC (%) −55° C. | TC (%) −30°C. | TC (%) 85° C. | TC (%) 125° C. | TCC (ppm/°C.) −55° C. to 25° C. | TCC (ppm/°C.) 25° C. to 125° C. | RC (ohm-farad) 50 v/mil 25° C. | RC (ohm-farad) 50 v/mil 125° C. | Dielectric Breakdown (V/mil) | Linear | EIA Code |
|---|---|---|---|---|---|---|---|---|---|---|---|---|---|
| 1 | 140 | 0.007 | 9.8 | 6.8 | −5.8 | −9.0 | −1225 | −900 | 5,200 | 525 | 1,400 | Yes, FIG. 2 | U2K |
| 2 | 135 | 0.025 | 8.2 | 5.6 | −5.0 | −8.2 | −1025 | −820 | 4,200 | 240 | 1,500 | Yes, FIG. 2 | U2J |
| 3 | 96 | 0.006 | 3.5 | 2.6 | −2.6 | −4.0 | −440 | −400 | 9,600 | 230 | 1,600 | Yes, FIG. 2 | T2H |
| 4 | 86 | 0.003 | 2.8 | 1.9 | −1.8 | −2.7 | −350 | −270 | 10,000 | 250 | 1,500 | Yes, FIG. 2 | S2H |
| 5 | 79 | 0.006 | 1.6 | 1.1 | −1.2 | −1.9 | −200 | −190 | 10,000 | 330 | 1,400 | Yes, FIG. 2 | R2H |
| 6 | 77 | 0.006 | 1.3 | 0.9 | −0.9 | −1.4 | −160 | −140 | 10,000 | 350 | 1,500 | Yes, FIG. 2 | P2G |
| 7 | 68 | 0.005 | 0.72 | 0.5 | −0.5 | −0.74 | −90 | −74 | 10,000 | 500 | 1,600 | Yes, FIG. 2 | UIG |
| 8 | 64 | 0.003 | 0.22 | 0.13 | −0.15 | −0.22 | −28 | −22 | 15,000 | 15,000 | 1,500 | Yes, FIG. 2 | SIG |

EXAMPLE II

A ceramic precursor composition in an amount greater than 500 kgs was made by uniformly mixing about 48.49 weight percent of high purity neodymium oxide (Nd₂O₃), about 33.71 weight percent titanium oxide (TiO₂), about 14.39 weight percent barium carbonate (BaCO₃), about 1.42 weight percent zirconium oxide (ZrO₂), about 1.48 weight percent silicon dioxide (SiO₂) and about 0.51 weight percent calcium titanate (CaTiO₃). The slurry was mixed, dried, pulverized, calcined, and milled to fine particle size in the same manner as described in Example I. About 30 grams of a ceramic composition was prepared by adding the ceramic precursor material, high purity strontium titanate (SrTiO₃), technical grade fine particle size niobium pentoxide (Nb₂O₅), and technical grade fine particle size cobalt oxide (CoO) according to the weight percents listed in Table 4. Ceramic disc samples were then prepared and their electrical properties evaluated in the same manner as described in Example I. The dielectric properties of disc capacitors summarized in Table 5 demonstrate that ceramic compositions of this invention have very low dissipation factors and linear TCC behavior.

Approximately 400 grams of each of the ceramic compositions 9-16 were used to make multilayer ceramic capacitor samples in the same manner as described in Example I. The dielectric properties, as summarized in Table 6, show that ceramic compositions of this invention have very low dissipation factors and linear TCC ehavior.

TABLE 4

| Composition | Precursor (wt. %) | SrTiO₃ (wt. %) | Nb₂O₅ (wt. %) | CoO (wt. %) | SrTiO₃ Precursor wt ratio |
|---|---|---|---|---|---|
| 9 | 40.20 | 56.60 | 3.14 | 0.26 | 1.40 |
| 10 | 43.57 | 53.13 | 3.04 | 0.26 | 1.22 |
| 11 | 60.49 | 36.66 | 2.58 | 0.27 | 0.61 | compositions 22 and 23, the ceramics have one or more of the following undesirable properties: lower K, high dissipation factors and/or large TCC variations. When the $Nb_2O_5$ concentration is less than 1.06 weight percent and CoO concentration is less than 0.23 weight percent, such as in compositions 24–26, the ceramic also has one or more of the following undesirable properties, lower K, high dissipation factors, large TCC variations.

TABLE 4-continued

| Composition | Precursor (wt. %) | $SrTiO_3$ (wt. %) | $Nb_2O_5$ (wt. %) | CoO (wt. %) | $SrTiO_3$ Precursor wt ratio |
|---|---|---|---|---|---|
| 12 | 69.85 | 27.64 | 2.24 | 0.27 | 0.40 |
| 13 | 78.63 | 19.11 | 1.98 | 0.28 | 0.24 |
| 14 | 82.99 | 14.89 | 1.84 | 0.28 | 0.18 |
| 15 | 87.39 | 10.60 | 1.73 | 0.28 | 0.12 |
| 16 | 98.34 | 0.00 | 1.37 | 0.29 | 0.00 |

Precursor =
$Nd_2O_3$: 48.49 wt. %
$TiO_2$: 33.71 wt. %
$BaCO_3$: 14.39 wt. %
$ZrO_2$: 1.42
$SiO_2$: 1.48 wt %
$CaTiO_3$: 0.51 wt %

TABLE 5

| Composition | 1 KHz, 1 VRMS | | TC (%) | | | | TCC (ppm/°C.) | | Linear | EIA Code |
| | K | DF (%) | −55° C. | −30° C. | 85° C. | 125° C. | −55° C. to 25° C. | 25° C. to 125° C. | | |
|---|---|---|---|---|---|---|---|---|---|---|
| 9 | 132 | .015 | 9.07 | 5.90 | −5.99 | −9.30 | −1130 | −930 | Yes | S2L |
| 10 | 126 | .014 | 7.95 | 5.38 | −5.79 | −8.95 | −990 | −895 | Yes | U2J |
| 11 | 101 | .010 | 4.95 | 3.11 | −3.74 | −5.80 | −620 | −580 | Yes | T2H |
| 12 | 91 | .010 | 3.37 | 2.08 | −4.34 | −4.34 | −420 | −430 | Yes | SZH |
| 13 | 81 | .005 | 2.18 | 1.26 | −2.78 | −2.78 | −270 | −275 | Yes | R2H |
| 14 | 75 | .010 | 1.56 | 0.88 | −2.12 | −2.12 | −195 | −210 | Yes | P2G |
| 15 | 65 | .010 | 0.96 | 0.37 | −1.07 | −1.07 | −120 | −110 | Yes | UIG |
| 16 | 58 | .010 | .23 | −0.11 | −0.40 | −0.40 | −29 | −40 | Yes | SIG |

TABLE 6

| Composition | 1 KHz, 1 VRMS | | TC (%) | | | | TCC (ppm/°C.) | | RC (ohm-farad) 50 v/mil | | Dielectric Breakdown (V/mil) | Linear | EIA Code |
| | K | DF (%) | −55° C. | −30° C. | 85° C. | 125° C. | −55° C. to 25° C. | 25°C. to 125°C. | 25° C. | 125° C. | | | |
|---|---|---|---|---|---|---|---|---|---|---|---|---|---|
| 9 | 140 | 0.015 | 8.32 | 3.98 | −5.29 | −8.10 | −1040 | −810 | 5,059 | 550 | 1,600 | Yes | U2K |
| 10 | 126 | 0.01 | 5.40 | 4.46 | −4.69 | −7.21 | −675 | −720 | 7,600 | 450 | 1,600 | Yes | U2J |
| 11 | 99 | 0.006 | 3.52 | 2.91 | −2.99 | −4.84 | −440 | −480 | 14,300 | 650 | 1,500 | Yes | T2H |
| 12 | 89 | 0.003 | 2.70 | 2.04 | −2.18 | −3.57 | −340 | −360 | 16,300 | 875 | 1,500 | Yes | S2H |
| 13 | 80 | 0.020 | 1.88 | 1.30 | −1.46 | −2.33 | −235 | −230 | 16,600 | 880 | 1,600 | Yes | R2H |
| 14 | 75 | 0.004 | 1.38 | 1.00 | −1.13 | −1.84 | −170 | −180 | 18,700 | 1,250 | 1,600 | Yes | P2G |
| 15 | 70 | 0.004 | 0.78 | 0.60 | −0.60 | −0.96 | −100 | −100 | 25,190 | 1,110 | 1,800 | Yes | UIG |
| 16 | 57 | 0.001 | 0.21 | 0.02 | −0.13 | −0.20 | −26 | −20 | 16,650 | 2,450 | 1,500 | Yes | SIG |

EXAMPLE III

Ceramic compositions as described in Table 7 were prepared in the same manner as described in Example I. The electrical properties of the disc capacitors made from the above compositions are evaluated and summarized in Table 8. The properties of composition 2 are also summarized in Table 8 for reference purposes. These properties demonstrate that when the $SrTiO_3$ to precursor weight ratio is greater than 1.22, such as in compositions 17 and 18, the TCC value for these ceramics is too large (exceeding negative 1000 ppm/°C.). When $Nb_2O_5$ is not included, such as in compositions 19 and 23, or when the CoO is not included, such as in

TABLE 7

| Composition | Precursor (wt %) | $SrTiO_3$ (wt %) | $Nb_2O_5$ (wt %) | CoO (wt %) | $SrTiO_3$ Precursor (wt. ratio) |
|---|---|---|---|---|---|
| 17 | 19.67 | 78.67 | 1.38 | 0.29 | 4.00 |
| 18 | 24.58 | 73.75 | 1.38 | 0.29 | 3.00 |
| 2 | 44.25 | 54.9 | 1.37 | 0.29 | 1.22 |
| 19 | 44.12 | 53.92 | 0 | 1.96 | 1.22 |
| 20 | 44.12 | 53.92 | 1.37 | 0.59 | 1.22 |
| 21 | 44.12 | 53.92 | 1.22 | 0.19 | 1.22 |
| 22 | 44.12 | 53.92 | 1.96 | 0.00 | 1.22 |
| | | | | Co | |
| 23 | 45.00 | 55.00 | 0.00 | 0.00 | 1.22 |
| 24 | 44.80 | 54.76 | 0.37 | 0.07 | 1.22 |
| 25 | 44.64 | 54.56 | 0.65 | 0.14 | 1.22 |
| 26 | 44.42 | 54.29 | 1.06 | 0.23 | 1.22 |
| 27 | 44.12 | 53.92 | 1.61 | 0.35 | 1.22 |
| 28 | 43.90 | 53.66 | 2.01 | 0.43 | 1.22 |

TABLE 8

| Composition | 1 KHz, 1 VRMS | | TC (%) | | | | TCC (ppm/°C.) | |
| | K | DF (%) | −55° C. | −30° C. | 85° C. | 125° C. | −55° C. to 25° C. | 25° C. to 125° C. |
|---|---|---|---|---|---|---|---|---|
| 17 | 180 | 0.15 | 16.0 | 13.0 | −9.8 | −15.0 | −2,000 | −1,500 |
| 18 | 180 | 0.15 | 13.5 | 12.4 | −8.8 | −13.4 | −1,690 | −1,340 |
| 2 | 126.5 | 0.03 | 8.121 | 6.49 | −4.90 | −7.57 | −1,000 | −760 |
| 19 | 110 | 0.08 | 6.80 | 6.80 | −4.20 | −6.20 | −850 | −620 |
| 20 | 125 | 0.021 | 8.70 | 7.20 | −5.2 | −8.21 | −1,080 | −820 |
| 21 | 135 | 0.10 | 9.60 | 8.20 | −5.4 | −8.3 | −1,200 | −830 |
| 22 | 350 | 17.0 | −54.0 | −47.0 | 13.5 | 33.3 | +6,750 | +3,300 |
| 23 | 850 | 12.8 | −60.0 | −33.0 | 18.0 | 52.0 | +7,500 | +5,200 |
| 24 | 500 | 15.5 | −63.0 | −44.0 | 14.0 | 33.0 | +7,875 | +3,300 |
| 25 | 250 | 13.0 | −41.0 | −35.0 | 9.0 | 18.0 | +5,125 | +1,800 |

TABLE 8-continued

| Composition | 1 KHz, 1 VRMS | | TC (%) | | | | TCC (ppm/°C.) | |
| --- | --- | --- | --- | --- | --- | --- | --- | --- |
| | K | DF (%) | −55° C. | −30° C. | 85° C. | 125° C. | −55° C. to 25° C. | 25° C. to 125° C. |
| 26 | 131 | 0.50 | 8.8 | 5.6 | −4.2 | −6.2 | −1,100 | −620 |
| 27 | 128 | 0.03 | 9.2 | 5.8 | −5.4 | −8.4 | −1,150 | −840 |
| 28 | 125 | 0.02 | 8.8 | 5.7 | −5.2 | −8.2 | −1,100 | −820 |

The values given from the examples herein are subject to variations based on factors known in the art. For example, with respect to compositions 1–28 herein, the dielectric constant may be significantly increased and the dissipation factor may be significantly decreased by pulverizing, milling, uniformly dispersing, or otherwise reducing the starting materials to very fine particles. Such practices, which are commonly carried out in the course of manufacturing ceramic capacitors, were not employed to their full extent in the preparation of Compositions 1–28. In addition, variations in firing conditions, sample thickness and preparation, and measurement error may result in differences in the observed values for the same composition. Thus, depending upon manufacturing techniques, and with little regard to particle size, the properties of ceramic composition made using the proportions given in Compositions 1–28 can vary from values given. For example, the dielectric constants may vary by +10.0%, the dissipation factor may vary by +0.02%, and the capacitance change with temperature versus capacitance at 25° C. per °C. may vary by +10 ppm. FIGS. 1 and 2 illustrate the change in capacitance for a given change in temperature for the compositions of this invention. It is understood that the invention is not limited to the illustrations described and shown herein, which are deemed to be merely illustrative of the best modes of carrying out the invention. The invention also encompasses all such modifications which are within the scope of the following claims.

What is claimed is:

1. A sinterable ceramic composition consisting essentially of about 40.2 to 98.34 weight % of a precursor material consisting essentially of about 48.49 weight % neodymium oxide, about 33.71 weight % titanium oxide, about 14.39 weight percent barium carbonate, about 1.42 weight % zirconium oxide, about 1.48 weight % silicon dioxide, and about 0.51 weight % calcium titanate, and a second material consisting essentially of about 0 to 57.51 weight % strontium titanate, about 1.27 to 3.14 weight % niobium pentoxide and about 0.23 to 0.43 weight % cobalt oxide.

2. The ceramic composition of claim 1, wherein the neodymium oxide has a purity of greater than 99.5%, the cobalt oxide has a purity of 70% to 74% of metallic cobalt and the balance of the components have a purity of at least 99%.

3. A ceramic composition according to claims 1 or 2 having a strontium titanate to precursor weight ratio of 1.40 and −1000 ppm/°C. TCC characteristics consisting essentially of about 40.21 weight percent of the ceramic precursor material, about 56.40 weight percent of strontium titanate, about 3.14 weight percent of niobium pentoxide, and about 0.26 weight percent of cobalt oxide.

4. A ceramic composition according to claims 1 or 2 having a strontium titanate to precursor weight ratio of 1.22 and −900 ppm/°C. TCC characteristics, consisting essentially of about 43.57 weight percent of the ceramic precursor material, about 53.13 weight percent strontium titanate, about 3.04 weight percent niobium pentoxide and about 0.26 weight percent cobalt oxide.

5. A ceramic composition according to claims 1 or 2 having a strontium titanate to precursor weight ratio of about 0.61 and −580 ppm/°C. TCC characteristics consisting essentially of about 60.49 weight percent of the ceramic precursor material, about 36.66 weight percent of strontium titanate, about 2.58 weight percent of niobium pentoxide, and about 0.27 weight percent of cobalt oxide.

6. A ceramic composition according to claims 1 or 2 having a strontium titanate to precursor weight ratio of about 0.40 and −430 ppm/°C. TCC characteristics consisting essentially of about 69.85 weight percent of the ceramic precursor material, about 27.64 weight percent of strontium titanate, about 2.24 weight percent of niobium pentoxide and about 0.27 weight percent of cobalt oxide.

7. A ceramic composition according to claims 1 or 2 having a strontium titanate to precursor weight ratio of about 0.24 and −275 ppm/°C. TCC characteristics consisting essentially of about 78.63 weight percent of the ceramic precursor material, about 19.11 weight percent of strontium titanate, about 1.98 weight percent of niobium pentoxide and about 0.28 weight percent of cobalt oxide.

8. A ceramic composition according to claims 1 or 2 having a strontium titanate to precursor weight ratio of about 0.18 and −210 ppm/°C. TCC characteristics consisting essentially of about 82.99 weight percent of the ceramic precursor material, about 14.89 weight percent of strontium titanate, about 1.84 weight percent of niobium pentoxide and about 0.28 weight percent of cobalt oxide.

9. A ceramic composition according to claims 1 or 2 having a strontium titanate to precursor weight ratio of about 0.12 with −110 ppm/°C. TCC characteristics consisting essentially of about 87.39 weight percent of the ceramic precursor material, about 10.60 weight percent of strontium titanate, about 1.73 weight percent of niobium pentoxide and about 0.28 weight percent of cobalt oxide.

10. A ceramic composition according to claims 1 or 2 having a strontium titanate to precursor weight ratio of 0 and −40 ppm/°C. TCC characteristics consisting essentially of about 98.34 weight percent of the ceramic precursor material, about 1.37 weight percent of niobium pentoxide and about 0.29 weight percent of cobalt oxide.

11. A multilayer ceramic capacitor consisting essentially of the compositions of any of the preceding claims cofired with electrodes comprising at least one metal selected from the group consisting of silver, gold, platinum, and palladium.

* * * * *